United States Patent [19]

Yanagi

[11] Patent Number: 5,033,037
[45] Date of Patent: Jul. 16, 1991

[54] TRACK ACCESS CONTROL CIRCUIT OF OPTICAL DISK UNIT

[75] Inventor: Shigenori Yanagi, Kawasaki, Japan

[73] Assignee: Fujitsu Limited, Kawasaki, Japan

[21] Appl. No.: 589,557

[22] Filed: Sep. 28, 1990

[30] Foreign Application Priority Data

Sep. 29, 1989 [JP] Japan ................................. 1-253982
Dec. 12, 1989 [JP] Japan ................................. 1-321911

[51] Int. Cl.$^5$ .............................................. G11B 7/00
[52] U.S. Cl. ................................. 369/32; 369/44.28;
369/44.29; 369/44.35; 369/44.36; 369/124;
369/43
[58] Field of Search ............... 369/32, 124, 44.26,
369/44.25, 44.28, 44.29, 44.35, 44.36, 44.41, 48,
50, 57, 126, 47, 43; 360/78.05, 78.06, 78.08,
78.001; 250/201.5

[56] References Cited

U.S. PATENT DOCUMENTS

| | | | |
|---|---|---|---|
| 4,513,406 | 4/1985 | Ishihara | 369/44.28 |
| 4,562,562 | 12/1985 | Moriya et al. | 369/33 |
| 4,607,358 | 8/1986 | Maeda et al. | 369/44.28 |
| 4,641,020 | 2/1987 | Iwai | 369/44.14 |
| 4,769,806 | 9/1988 | Takamori | 369/44.32 |
| 4,837,757 | 6/1989 | Okada et al. | 369/44.14 |
| 4,858,214 | 8/1989 | Baba | 369/44.28 |
| 4,899,325 | 2/1990 | Katsuhara et al. | 369/32 |
| 4,901,299 | 2/1990 | Nakatsu | 369/32 |
| 4,955,011 | 9/1990 | Baba | 369/54 |
| 4,985,882 | 1/1991 | Tahaka et al. | 369/44.32 |

FOREIGN PATENT DOCUMENTS 58-166567 10/1983 Japan .
63-225974 9/1988 Japan .
64-14778 1/1989 Japan .
1-105335 4/1989 Japan .

Primary Examiner—Roy N. Envall, Jr.
Assistant Examiner—Thang V. Tran
Attorney, Agent, or Firm—Armstrong, Nikaido, Marmelstein, Kubovcik & Murray

[57] ABSTRACT

A track access control circuit of an optical disk unit comprising a track actuator (14) with an object lens driven at a relatively high frequency and a positioner for moving the track actuator at a relatively low frequency, a beam moving velocity or a target velocity of the positioner being modified and applied as a driving current to the positioner for preventing a tracking delay of the positioner from occurring during a seek operation.

11 Claims, 13 Drawing Sheets

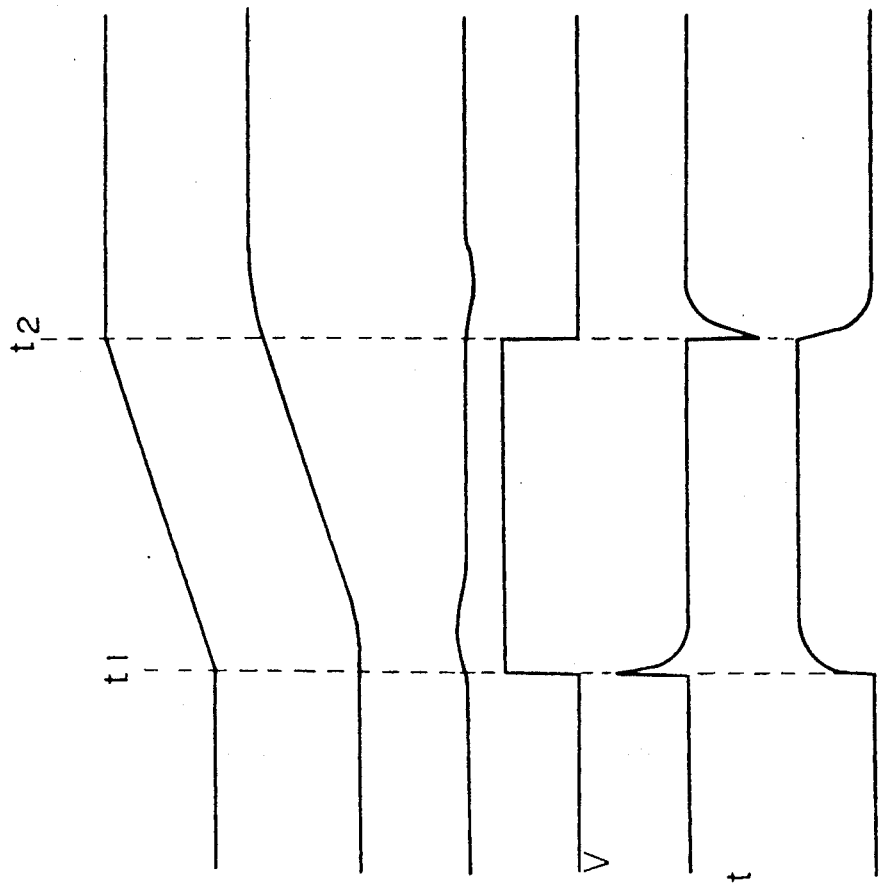

TRACK ACCESS CONTROL CIRCUIT OF OPTICAL DISK UNIT

BACKGROUND OF THE INVENTION

Field of the Invention

The present invention relates to a track access control circuit for an optical disk unit that carries out a seek operation by using a double servo, i.e., a control of the velocity of a movable part in an actuator incorporated in an optical head block and a control of the the position of a positioner driven by a Voice-Coil Motor (VCM).

In an optical disk unit, a track pitch can be set to be as small as several microns. Therefore, the storage capacity of the optical disk unit is huge. This is the reason why the optical disk unit is attracting attention in recent years for use as a large capacity storage device for a computer system and so forth.

The optical disk includes an optical head which has an actuator mounting an object lens. The actuator has a moving part for moving a light beam spot to a target position on the disk. A two-dimensional actuator is known as an example of the actuator. The actuator is mounted on a positioner driven by a voice-coil motor. Therefore, in the following, the positioner is also referred to as a VCM positioner. The actuator has a moving part of, for example, an arm and an object lens attached to an end of the arm in case of the two-dimensional actuator. In the two dimensional actuator, tracking control is carried out by turning the arm around a center shaft of the arm to move the lens. In this way, a light beam is moved across tracks on a disk medium, and focusing control is carried out by driving the arm along the shaft. The present invention relates to the tracking control.

To move the object lens to the target position, there are three kinds of controls, i.e., a coarse control, a lens-seek control, and a fine control. In the coarse control, the VCM positioner is controlled by the voice-coil motor (VCM) and the focusing control is effected on the two-dimensional actuator. The tracking control of the actuator is not effected in the coarse control. In the lens-seek control, the actuator is controlled to move the object lens over 20 to 30 tracks to the target position. Independent from the lens-seek control, the positioner is controlled by a positioner servo circuit so as to keep the position of the actuator at the neutral position with respect to the positioner. Namely, the control of the VCM positioner and the control of the actuator are carried out by separate servo loops which are called as double servo. In the fine control, the tracking control is effected on the object lens rotatably mounted on the two-dimensional actuator and the VCM positioner is also controlled to follow the movement of the object lens.

In the coarse control, the two-dimensional actuator can access a track by moving the positioner within a relatively wide range of tracks. After the coarse control, the lens seek control for moving a light beam to a target track position is carried out by controlling the velocity of the actuator. Independent from the lens-seek control, the positioner is controlled by a positioner servo circuit so as to keep the position of the actuator at the neutral position with respect to the positioner. Upon the light beam reaching the target track position, the control is switched to the fine control that is carried out according to a tracking error signal. At the same time with the control of the object lens on the actuator, a deviation and direction of the obJect lens from a neutral position with respect to the VCM positioner are detected by a position sensor, and the positioner is controlled by driving the voice-coil motor (VCM) to let the object lens always keep the neutral position with respect to the positioner. In this way, double servo control, i.e., the control of the moving part in the actuator and the control of the positioner, is achieved. The reason why the actuator is to be kept at the neutral position is because the roundness of a beam spot deteriorates to disable a read/write operation if the beam deviates from the neutral position. Namely, the read/write operation must be carried out only when the center of the light beam focuses on the target position.

In order not to respond rapidly to the mechanical play in the structure of the actuator, a servo frequency for the positioning control of the VCM positioner must be set very low. This causes a large tracking delay of the movement of the VCM positioner with respect to a servo operation of the actuator during a seek operation, so that it may take a long time after a light beam reaches a target track until the actuator is returned to the neutral position by the positioning control.

In this way, conventionally, a long settling time is needed after the completion of the lens seek operation until the read/write enable state is established, depending on a tracking delay of the positioner driven by the VCM. This hinders high-velocity accessing. It is therefore necessary to resolve this problem to realize high-velocity accessing.

SUMMARY OF THE INVENTION

To solve the problems in the conventional art an object of the present invention is to provide a track access control circuit of an optical disk unit that resolves the tracking delay of a VCM positioner during a seek operation to realize high-velocity accessing.

To attain the above object, there is provided, according to the present invention, a track access control circuit of an optical disk unit, comprising a track actuator having a base and a movable part associated with the base with a mechanical play therebetween. The movable part moves a light beam on a rotary medium. The track access control circuit further comprises a positioner, fixed to the base of the track actuator, for moving the track actuator in a diametral direction of the rotary medium. The track access control circuit further comprises a track actuator servo circuit, operatively connected to the rotary arm of the track actuator, for controlling the rotary arm at a relatively high frequency, a positioner servo circuit, operatively connected to the positioner, for controlling the positioner in such a way that the movable part of the track actuator is kept to be positioned at a neutral position with respect to the positioner, the frequency of the control of the positioner being limited to a relatively low value due to the mechanical play between the movable part and the base, a seek circuit, operatively connected to the movable part of the track actuator, for controlling the velocity of the movable part in accordance with an error of the velocity of the moving light beam with respect to a target velocity, and moving the light beam to a target track position, and a control circuit, operatively connected to the track servo circuit, to the positioner servo circuit, and to the seek circuit, for putting the track servo circuit into an inoperable state and for putting the positioner servo circuit and the seek circuit into operating states during a seek operation, so as to move the light beam to the target track position with co-operation of the movable part of the track actuator and the positioner, while, upon the light beam reaching the target track position, for putting the seek circuit in an inoperative state and for putting the track servo circuit and the positioner servo circuit to let the light beam follow the target track by a double servo action of the movable part of the track actuator and the positioner.

According to the present invention, the track access control circuit still further comprised a velocity signal generating circuit for generating a velocity signal having a predetermined relationship with the target velocity of the positioner during the seek operation, and a positioner-velocity modification circuit for modifying an output of the positioner servo circuit based on the velocity signal output from the velocity signal generating circuit.

The velocity signal output from the velocity signal generating circuit may be a target velocity of the positioner set by the control circuit or a moving velocity of the light beam detected by the seek circuit based on a tracking error signal.

Preferably, the seek means comprises a velocity signal generating circuit for forming a beam moving velocity based on the tracking error signal, a velocity error detecting circuit for detecting a velocity error of the velocity signal provided by the velocity signal generating circuit with respect to a target velocity signal set by the control circuit, and a remaining track number detection circuit for detecting the number of remaining tracks to a target track for informing the control circuit of the completion of the seek operation when the number of remaining tracks becomes zero.

According to one aspect of the present invention, the velocity signal generating circuit comprises a positioner moving velocity detecting circuit for detecting the moving velocity of the positioner, a target velocity signal generating circuit for setting a target velocity of the positioner during the seek operation, and a subtracting circuit for subtracting the moving velocity of the positioner from the target velocity to provide the velocity signal, and the positioner-velocity modification circuit comprises an adding circuit for adding the output of the positioner servo circuit and the velocity signal, the added signal being supplied to the positioner during the seek operation.

In place of the target velocity signal generating circuit, a beam-moving velocity detecting circuit for detecting a moving velocity of the light beam based on the tracking error signal may be employed.

According to another aspect of the present invention, the velocity signal generating circuit comprises a beam-moving velocity detecting circuit for detecting a moving velocity of the light beam based on the tracking error signal, and a differential circuit for differentiating the moving velocity of the light beam; and the positioner-velocity modification circuit comprises an adding circuit for adding the output of the positioner servo circuit and the output of the differential circuit, the added signal being supplied to the positioner during the seek operation.

Instead of the beam-moving velocity detecting circuit in the above-mentioned aspect, a target velocity signal generating circuit for setting a target velocity of said positioner during the seek operation may also be employed.

The track actuator is a two-dimensional actuator having the base and a rotary arm as the movable part, the rotary arm being provided with an obJect lens for focusing a light beam on a rotary medium, the rotary arm being rotatable to move the light beam across tracks of a rotary medium, the rotary arm being movable through a shaft associated with the base by the mechanical play.

The positioner servo circuit comprises a circuit for controlling the positioner in such a way as to minimize a direction-position signal that indicates a deviation and direction of the movable part from a neutral position with respect to the base.

According to another aspect of the present invention, the positioner servo circuit may comprise a circuit for controlling the positioner in such a way as to minimize the tracking error signal.

BRIEF DESCRIPTION OF THE DRAWINGS

FIGS. 18A to 18F are graph diagrams for explaining the effect of the second embodiment of the present invention.

DESCRIPTION OF THE PREFERRED EMBODIMENTS

Figure 1:
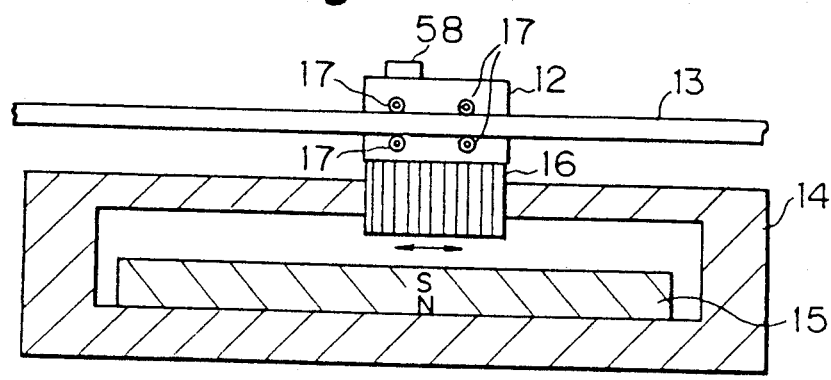
FIG. 1 is a side view of an assembly of an optical head block and a VCM positioner applied to the present invention.

Throughout the specification and the drawings, the same reference numerals represent the same parts.

For better understanding of the present invention, a general construction of an optical head block and a VCM positioner is first described with reference to FIG. 1. In FIG. 1, 12 is an optical head block, 13 is a guide rail along which the optical head block moves, 14 is a magnetic circuit, 15 is a magnet, 16 is a voice coil magnet (VCM) positioner adhered to the optical head block 12. 17 are bearings for smoothly moving the optical head block along the guide rail 13, and 58 is an object lens. By energyzing the VCM positioner 16, it moves along the magnetic circuit 14 so that the optical head block 12 is driven to move along the guide rail 13.

Figure 2:
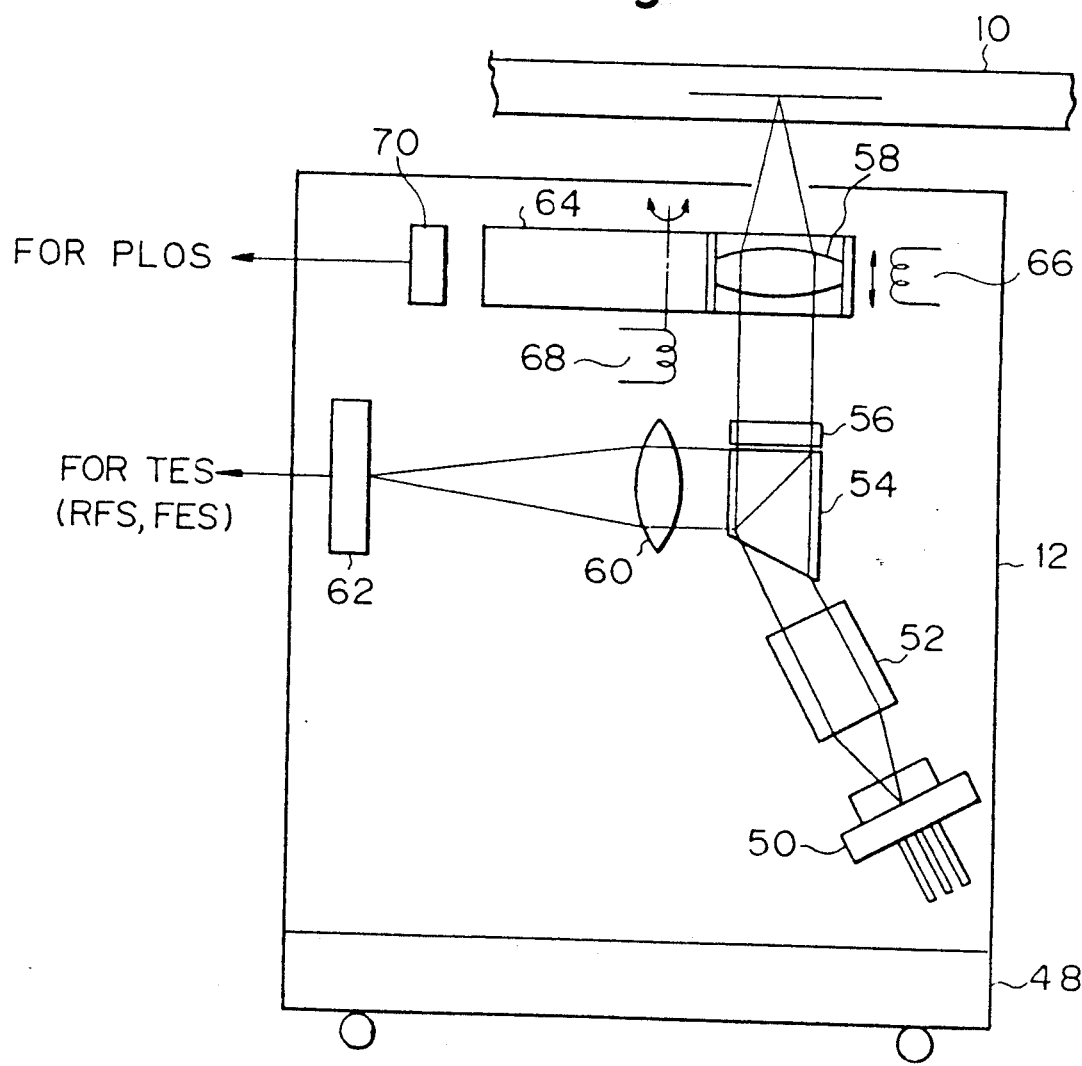
FIG. 2 is a schematic diagram showing the construction of the optical head block.

FIG. 2 is a schematic view showing an example of the optical head block applied to the present invention.

In FIG. 2, the VCM positioner 16 moves a carriage 48 in a radial direction of an optical disk 10. The optical head block 12 is mounted on the carriage 48. The optical head block 12 includes a semiconductor laser 50, a collimator lens 52 for converting elliptic diffused light from the semiconductor laser 50 into a circular parallel beam, a polarization beam splitter 54 involving two prisms for passing p-polarized light as it is and reflecting S-polarized light in the orthogonal direction with respect to the incident direction, a quarter-wavelength plate 56 for converting incident linear-polarized light into circular-polarized light and circular-polarized light into linear-polarized light, an object lens 58 for irradiating the optical disk 10 with a beam spot of 1 micrometer or smaller in diameter, a condenser lens 60 for condensing reflected light from the optical disk 10 reflected by the polarization beam splitter 54 in an orthogonal direction, and a quartered photosensor 62 for detecting a tracking error. The quartered photosensor 62 provides an output in response to a light strength pattern of portions where zero-order diffracted light and first-order diffracted light reflected and diffracted by a track guide groove of the optical disk 10 and passed through the condenser lens 60 overlap each other. A method of detecting a tracking error by the quartered photosensor 62 is known as a push-pull method or a far-field method. A sum of signals on photo sensing portions of the quartered photosensor 62 may provide a high-frequency regenerated signal RFS, and the difference of sums of two diagonal photosensing portions may provide a focusing error signal FES (in the case of astigmatism method).

The object lens 58 is fitted to a two-dimensional actuator 64. The actuator is not limited to the two-dimensional actuator, but various kinds of actuators may be employed in the present invention as long as a double servo is effected. The actuator 64 is rotated around a rotary shaft by a tracking coil 68, and moved in an axial direction of the rotary shaft by a focusing coil 66. A position sensor 70 is provided to correspond to the actuator 64. In response to an output of the position sensor 70, the direction-position signal LPOS is obtained. The signal LPOS indicates a deviation and direction of the actuator 64 from a reference position which is a neutral position of the actuator 64.

Figure 3:
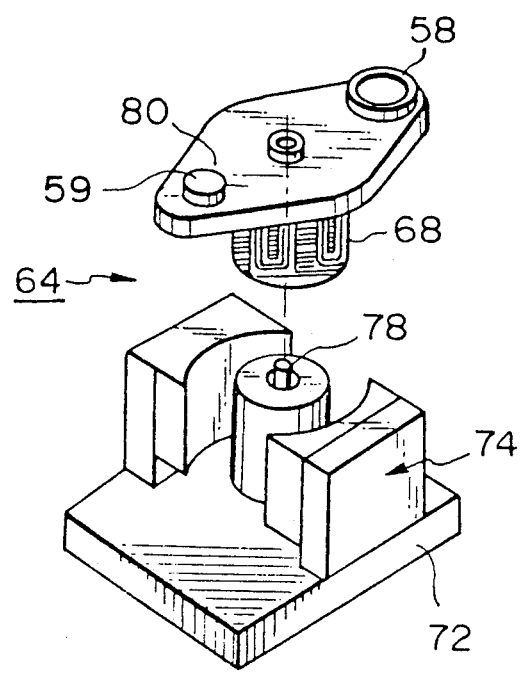
FIG. 3 is a perspective view showing a two-dimensional actuator in the optical head block.
Figure 4:
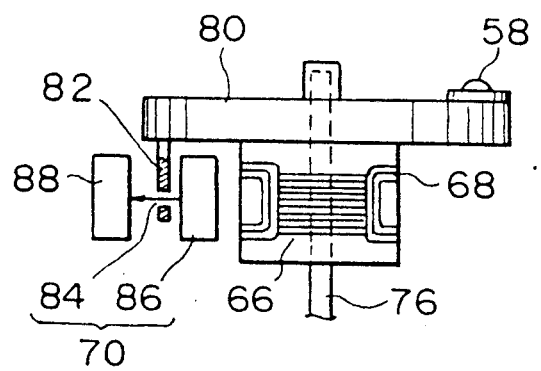
FIG. 4 is a side view of the two-dimensional actuator.

FIG. 3 is a perspective view showing the two-dimensional actuator 64 in the optical headblock. FIG. 4 shows the rotary portion of the actuator 64.

In FIGS. 3 and 4, the actuator 64 has a base 72 on which a magnetic circuit 74 is fixed. An upright side shaft 76 is disposed at the center of the magnetic circuit 74. The base 72 is adhered to the VCM positioner 16 and therefore is stationary as long as the VCM positioner 16 does not move, while a rotary arm 80 is movable even when the VCM positioner 16 does not move. The rotary arm 80 has a lower cylindrical portion 78 around which the tracking coil 68 and the focusing coil 66 are disposed. The object lens 58 is mounted on an end of the rotary arm 80, and a balancing weight 59 is mounted on the opposite end of the rotary arm 80. The rotary arm 80 has a center shaft hole fitted to the slide shaft 76 of the base 72. The rotary arm 80 is rotatable around the shaft and slidable along the shaft.

Corresponding to movable parts shown in FIG. 4, the position sensor 70 is provided for detecting the rotating direction and rotated amount of the actuator 64 relative to the neutral position. Namely, the position sensor 70 includes a sit plate 82 fitted to the lower surface of an end of the rotary arm 80 opposite to the object lens 58. The slit plate 82 has a slit hole 84. A light emitting portion 86 is fixed to the inside of the sensor 70. The light emitting portion 86 emits light that passes through the slit hole 84. The emitted light is received by a halved photosensor 88. By this construction, at the neutral position with respect to the VCM positioner, two photosensing portions of the halved photosensor 88 receive equal amount of light. When the rotary arm 80 turns, however, one of the photosensing portions on the turning side receives more light, and the other photosensing portion receives a smaller amount of light.

As is apparent from FIGS. 3 and 4, in the two-dimensional actuator 64, the rotary arm 80 is rotatable and slidable around and along the slide shaft 76, so that the actuator 64 has a relatively large amount of mechanical pay around the shaft. With respect to a movement of the rotary arm 80 achieved by the tracking coil 68, the VCM positioner 16 drives the base 72 to move the rotary arm 80 to return to the neutral position. Here, a servo frequency band of the servo system for driving the VCM positioner 16 is limited to a very low frequencY band of around 30 Hz due to the mechanical play between the shaft of the rotary arm and the base 72.

It has been known that an optical disk unit achieves a seek operation by using a the double servo. The double servo includes the control of the velocity of the two-dimensional actuator 64 mounted on the optical head block 12 and the positioning control of the VCM positioner 16.

Figure 5:
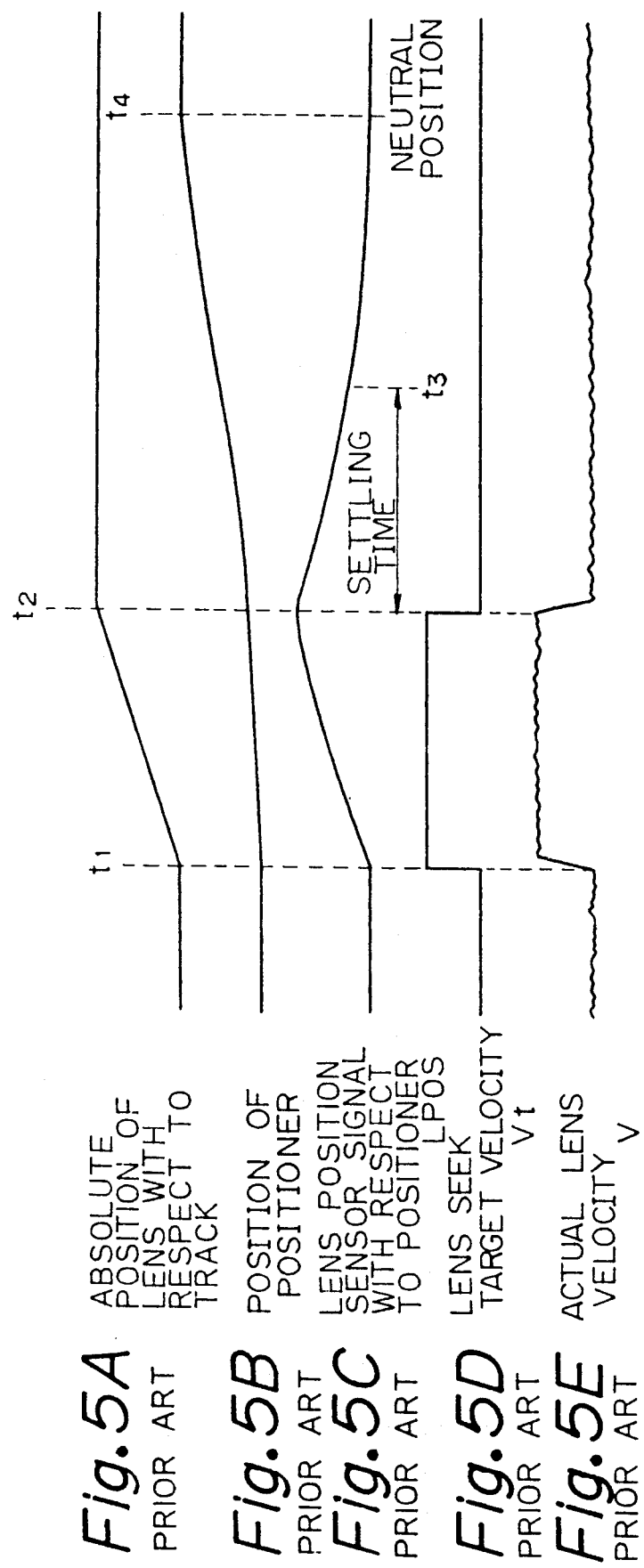
FIGS. 5A to 5E are graph diagrams for explaining the conventional seek operation.

FIGS. 5A to 5E are graph diagrams for explaining the conventional seek operation. FIG. 5A shows the absolute position of the lens with respect to the track; FIG. 5B shows the position of the positioner; FIG. 5C shows the lens position sensor signal with respect to positioner; FIG. 5D shows the lens seek target velocity; and FIG. 5E shows the actual lens velocity.

In FIGS. 5A to 5E, at a time t1, access to a target track is started. Namely, before the time t1, fine control is carried out by the double servo tracking control by the two-dimensional actuator 64 based on a tracking error signal TES and positioning control by the VCM positioner 16 based on a direction-position signal LPOS provided by a position sensor disposed on the two-dimensional actuator. The positioning control by the VCM positioner may be effected based on the tracking error signal TES instead of the direction position signal LPOS. At the time t1, a seek instruction is provided to switch the fine control to lens seek control. Namely, the servo control based on the tracking error signal is stopped, and the lens seek control, i.e., velocity control is started. In the lens seek control, a velocity error Ve is detected as a difference between a target velocity Vt and an actual lens velocity V to control the velocity of the two-dimensional actuator 64 in such a way as to minimize the velocity error Ve and obtain the target velocity Vt. According to the velocity control, the lens reaches the target track position at time t2, and the control is switched again to the fine control.

The above-mentioned conventional seek operation, however, cannot establish a read/write enable state immediately after the lens seek control is switched to the fine control but requires a very long setting time.

This is because the two-dimensional actuator is structured to be driven around and along a shaft and, therefore, its movable parts have a large amount of mechanical play. Accordingly, in using the direction-position signal LPOS for the positioning servo control of the VCM positioner 16, a servo frequency band must be very low, e.g., around 30 Hz.

On the other hand, a servo frequency band of a tracking coil of the two-dimensional actuator 64 is very high. e.g., on the order of KHz, so that it may provide a very quick motion compared to that provided by the servo of the VCM positioner 16.

As a result, when the seek is completed and the fine control is started at the time t2 in FIGS. 5A to 5E, the actuator 64 is greatly deviated from the neutral position as is apparent from the lens position sensor signal LPOS shown in FIG. 5C. Thereafter, the positioning servo by the VCM positioner 16 is effected to slowly bring the actuator 64 to the neutral position. When the actuator returns to the neutral position at time t3 to provide a beam spot which is sufficiently round to carry out a read/write operation, a read/write enable state is established.

In this way, a long settling time is needed after the completion of the lens seek operation until the read/write enable state is established, depending on a tracking delay of the VCM positioner 16. This hinders high-velocity accessing.

To solve the problems of the above-described conventional art, an object of the present invention is to provide a track access control circuit of an optical disk unit that can resolve the tracking delay of a VCM positioner during a seek operation to realize high-velocity accessing.

Figure 6:
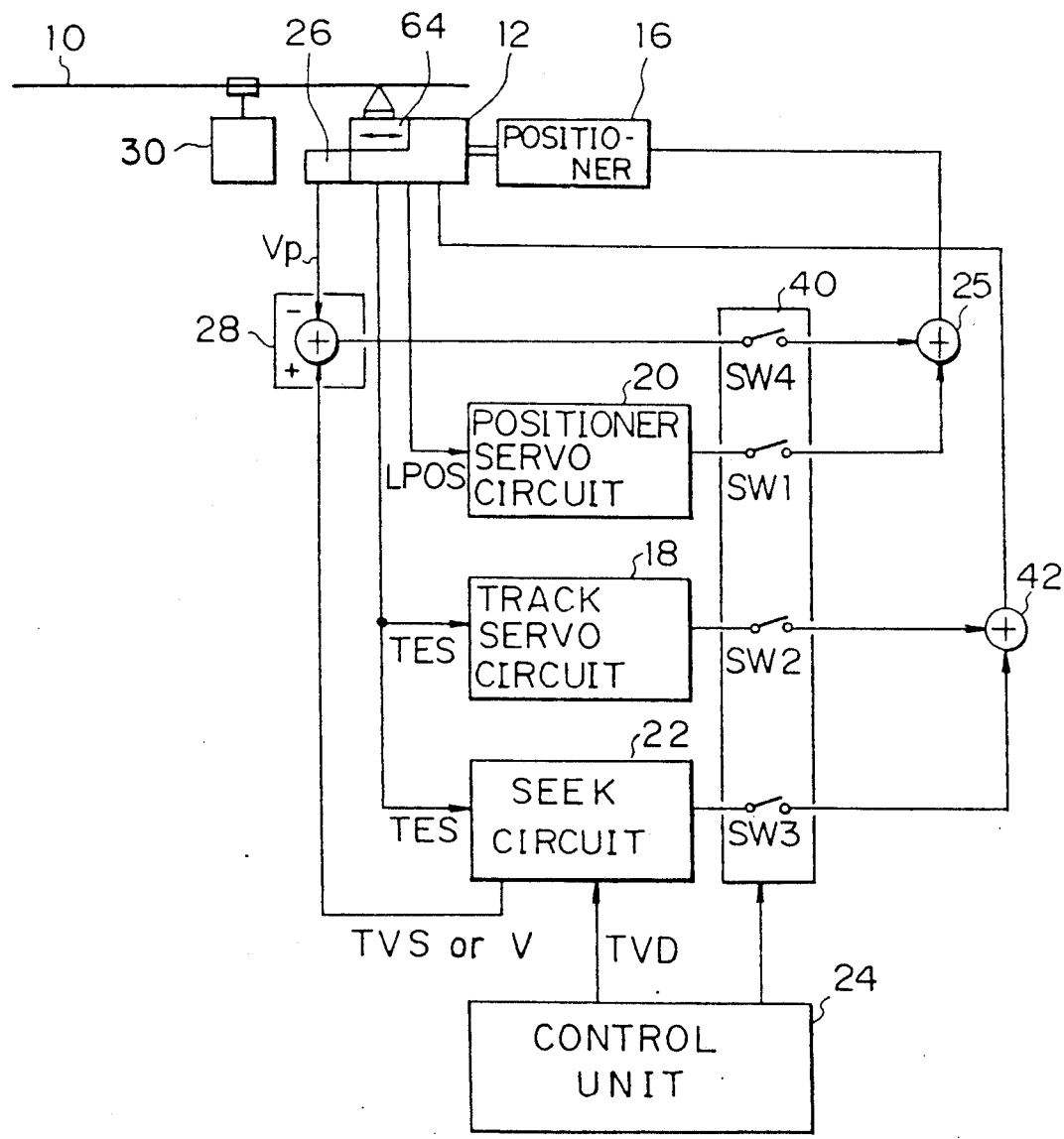
FIG. 6 is a block diagram for explaining the principle of the first embodiment of the present invention.

FIG. 6 is a block diagram for explaining the principle of the first embodiment of the present invention.

In FIG. 6, a medium 10 is rotated at a constant velocity. An optical head block 12 records and regenerates information onto and from tracks of the medium 10. The optical head block 12 has a track actuator 64, e.g., a two-dimensional actuator. The track actuator 14 includes a rotary arm having an object lens for moving a light beam across the medium tracks for several tracks, as shown in FIG. 3.

Further, the optical head block 12 is moved by a positioner 16 in a diametral direction of the medium 10.

The rotary arm n the track actuator 64 mounted on the optical head block 12 is controlled by a track servo circuit 18 in such a way as to minimize a tracking error signal TES obtained from a reflected beam from the medium 10.

The positioner 16 is controlled by a positioner servo circuit 20 in such a way as to minimize a direction-position signal LPOS that indicates a deviation and direction of the rotary arm in the track actuator 14 from a neutral position, or in such a way as to minimize the tracking error signal TES.

In addition, the velocity of the rotary arm in the track actuator 14, i.e., the two-dimensional actuator is controlled by a seek circuit 22 based on a velocity error of the velocity of a moving beam with respect to a target velocity, thereby moving the beam to a target track position.

A control circuit 24 always achieves positioning servo of the positioner 16 by the positioner servo circuit 20 by maintaining a switch SW1 in an ON state.

During a seek operation, the control circuit 24 puts the track servo circuit 18 in an inoperable state and operates the seek circuit 22. With co-operation of the rotary arm in the track actuator 64 and the positioner 16, the light beam from the optical head block 12 is moved to the target track position. When the light beam reaches the target track position, the control circuit 24 puts the seek circuit 22 in an inoperable state, and operates the track servo circuit 18, thereby letting the light beam keep following the target track by the double servo of the rotary arm in the track actuator and the positioner.

In this optical disk unit, to prevent a tracking delay from occurring during seek in the positioner servo circuit 20 having a low servo frequency band, according to the first embodiment of the present invention, a velocity detecting circuit 26 is provided for detecting a velocity of the moving optical head block 12 driven by the positioner 16, and a positioner velocity control circuit 28 for controlling the velocity of the positioner 16 in response to a deviation between a target velocity signal TVS or a beam moving velocity signal V obtained through the velocity control by the seek circuit 22 during the seek operation and a positioner moving velocity Vp obtained by the velocity detecting circuit 26. The positioner velocity control circuit 28 consists of a subtractor for subtracting the positioner moving velocity Vp from the target velocity signal TVS or a beam moving velocity signal V.

According to the above arrangement of the first embodiment of the present invention, in addition to the positioning control by the positioner servo during the seek operation, velocity control is carried out to make a velocity deviation between a target velocity signal Vt generated for controlling the velocity of the actuator and a velocity Vp of the moving optical head block driven by the VCM positioner 16 to be zero. Even if the VCM positioner is driven at a very low servo frequency, the VCM positioner 16 can move the optical head block 12 in response to a movement of the object lens driven by the track actuator. Accordingly, the rotary arm 80 (see FIG. 3) in the track actuator 64 is kept substantially at the neutral position with respect to the VCM positioner 16, and a settling time from the completion of seek to the establishment of a read/write enable state can greatly be reduced, thereby realizing high-velocity accessing.

Figure 7:
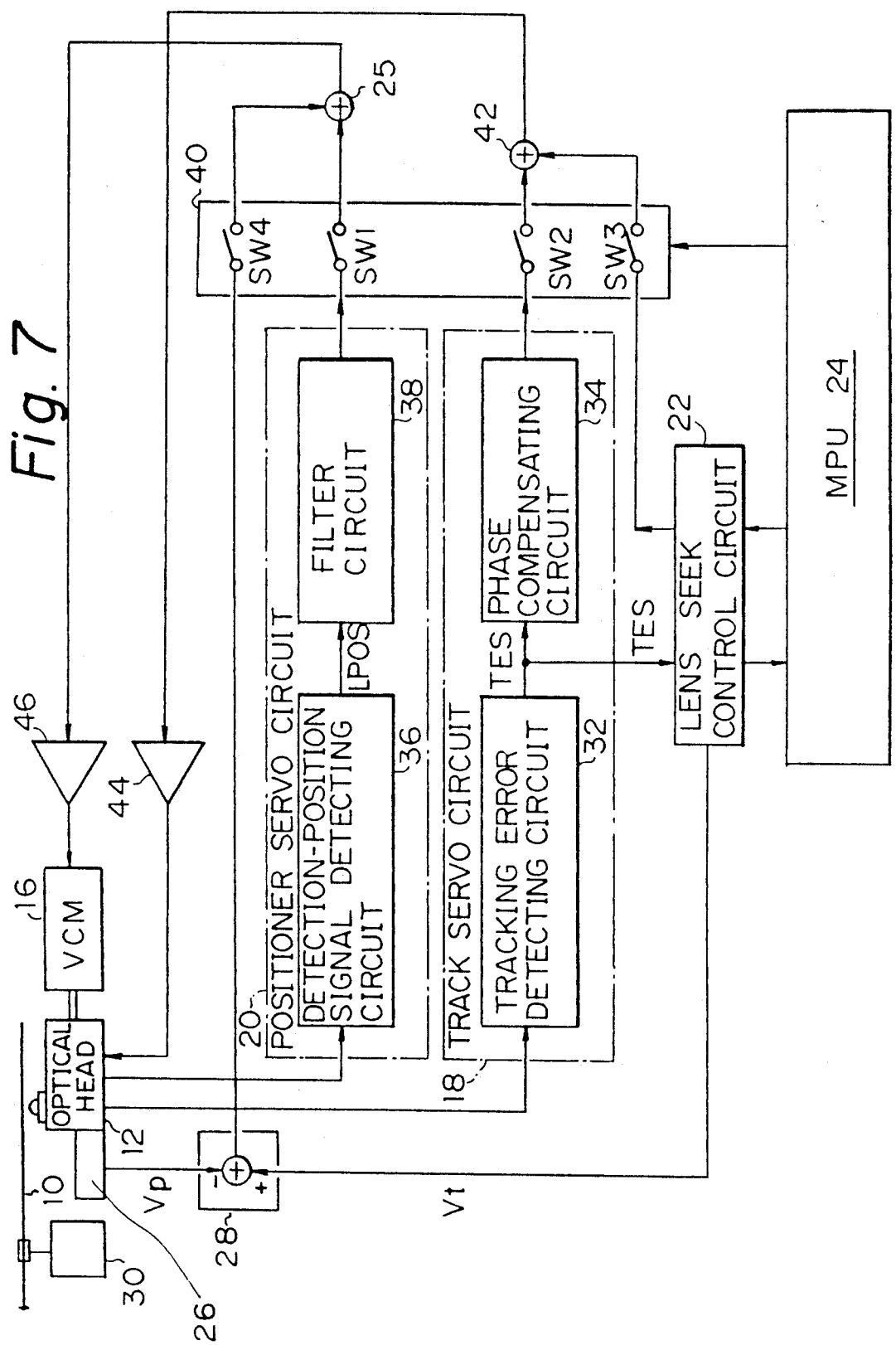
FIG. 7 is a block diagram showing the first embodiment in detail.

FIG. 7 is a block diagram showing the first embodiment of the present invention in detail.

In FIG. 7, numeral 10 denotes a medium, i.e., an optical disk rotated by a spindle motor 30 at a constant velocity of, for example, 3600 rpm. The optical disk 10 has an optical head block 12 that is movable in a diametral direction of the optical disk. The base 72 (see FIG. 3) of the optical head block 12 is driven by a VCM positioner 16. The optical head block 12 incorporates a quartered photosensor that receives reflected light from the disk to detect a tracking error signal, and a position sensor for detecting a deviation and direction of the rotary arm 80 from a neutral position with respect to the VCM positioner 16. An output of the quartered photosensor is provided to a track servo circuit 18, and an output of the position sensor is provided to a positioner servo circuit 20.

The track servo circuit 18 includes a tracking error detecting circuit 32 and a phase compensating circuit 34. The tracking error detecting circuit 32 detects a tracking error signal TES from an output of the quartered photosensor arranged in the optical head 12. The phase compensating circuit 34 compensates a phase advance of the tracking error signal TES with respect to high-frequency-band components of a servo frequency band, and provides the phase-compensated signal to a switch SW2 in a control switch circuit 40, which provides the signal to a power amplifier 44 through an adder 42. An output of the power amplifier 44 drives a tracking coil of a track actuator 64 such as the two-dimensional actuator shown in FIG. 2.

The positioner servo circuit 20 includes a direction-position signal detecting circuit 36, and a filter circuit 38. The direction-position signal detecting circuit 36 receives an output of, for example, a halved photosensor that detects a deviation of the two-dimensional oscillating track actuator disposed in the optical head block 12 from the neutral position, and the circuit 36 generates a direction-position signal LPOS. The filter circuit 38 filters high-frequency-band components of a servo frequency band to suppress the frequency band of the signal LPOS, which is then supplied to a power amplifier 46 through a switch SW1 in the switch control circuit 40 and an adder 28. The power amplifier 46 drives the VCM positioner 16.

The track servo circuit 18 has a high servo frequency band of 2 to 5 KHz, while the positioner servo circuit 20 has a very low servo frequency band of around 30 Hz due to the mechanical play of a shaft of the two-dimensional actuator 64 (see FIG. 2) disposed in the optical head block 12.

Numeral 24 denotes a microprocessing unit (MPU) acting as a control means. The MPU 24 carries out a seek operation by the lens seek control based on an access demand from a higher device, and switches to fine control after the completion of the seek operation.

Numeral 22 denotes a lens seek control circuit. According to the present invention, the circuit 22 carries out a seek operation to move the rotary arm 80 so as to move a light beam to a target track by controlling the velocity of the two-dimensional actuator 64 incorporated in the optical head block 12. The MPU 24 provides target velocity data to the lens seek control circuit 22. On the other hand, a beam moving velocity V is detected from the tracking error signal TES provided by the tracking error detecting circuit 32. When receiving a seek operation instruction from the MPU 24, the lens seek control circuit 22 subtracts the actual velocity V from the target velocity Vt to find a velocity error Ve, which drives the tracking coil of the two-dimensional actuator 64 disposed in the optical head block 12 through a switch SW3 in the control switch circuit 40, an adder 42, and a power amplifier 44.

Further, according to the present invention, in order to prevent a tracking delay of the VCM positioner 16 driven by the positioner servo circuit 20 during a seek operation, a velocity detector 26 and a positioner velocity control circuit 28 are provided. Namely, the velocity detector 26 is provided for the optical head block 12 to detect a velocity of the base of the optical head block 12 driven by the VCM positioner 16, i.e., a positioner moving velocity. The velocity control circuit 28 comprises a subtractor, which finds a deviation between the positioner moving velocity Vp detected by the velocity detector 26 and the target velocity signal Vt or the beam moving velocity V obtained by the lens seek control circuit 22 during seek control, and provides a velocity control signal to be given to an adder 25 of the positioner servo circuit 20 through a switch SW4 of the control switch circuit 40.

Figure 8:
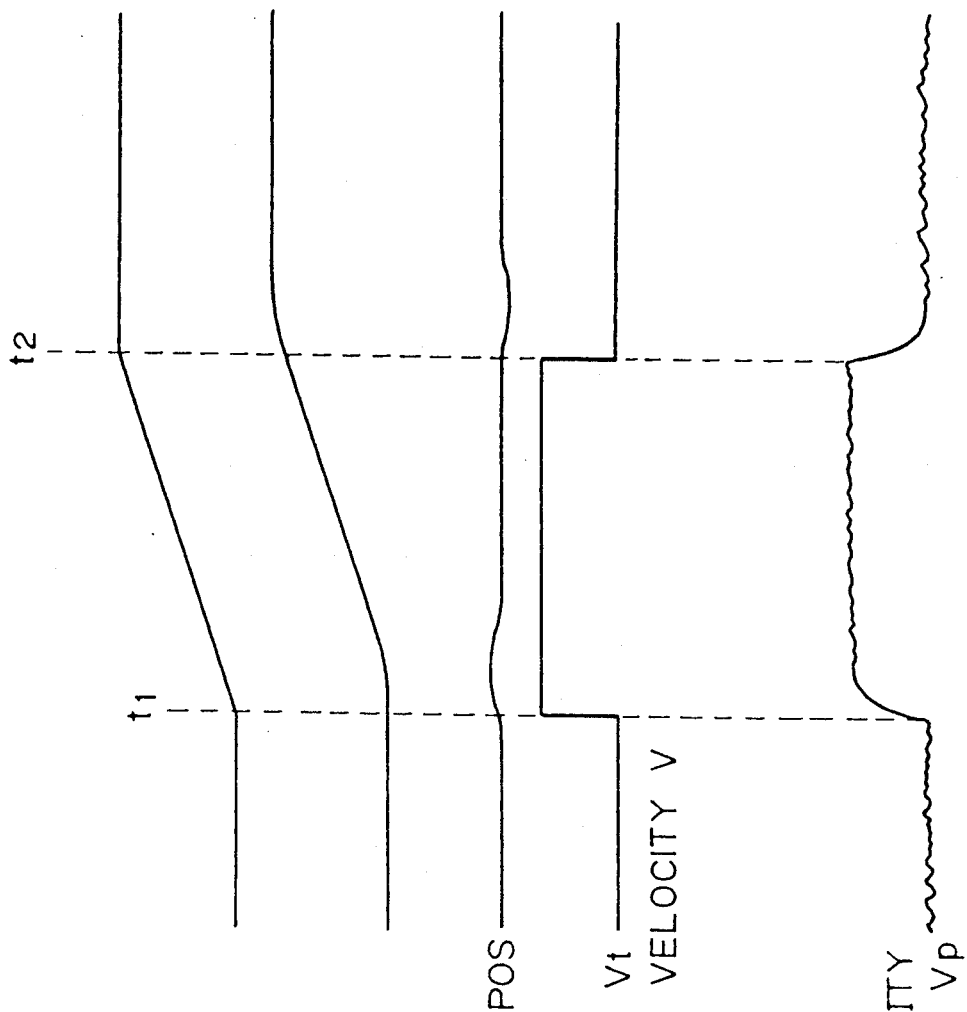
FIGS. 8A to 8E are graph diagrams for explaining the effect of the first embodiment of the present invention.

FIGS. 8A to 8E are graphs for explaining the effect of the first embodiment of the present invention. In the figures, at time t1, the seek operation starts, and the seek operation ends at time t2. At the time t1, the lens is positioned at a starting position, and at the time t2, the lens reaches the target position of the track, as shown in FIG. 8A. During the seek period between the times t1 and t2, the lens seek target velocity Vt or the beam moving velocity V is generated as shown in FIG. 8D. According to the target velocity Vt or the beam moving velocity V, the velocity of the VCM positioner 16 is controlled, so that the velocity Vp of the moving VCM positioner 16 has only a slight rise delay and a fall delay with respect to the lens seek target velocity Vt as shown in FIG. 8E. As a result, the position of the positioner 16 follows rapidly the position of the lens as shown in FIG. 8B. Therefore, a fluctuation of the lens position sensor signal, i.e., the direction-position signal LPOS is produced only slightly just after the start of the seek and just after the end of the seek as shown in FIG. 8C. Accordingly, at the time of the switching from the lens seek control to the fine control again immediately after the time t2, the rotary arm 80 of the two-dimensional actuator, i.e., the object lens, is positioned substantially at the neutral position with respect to the positioner. Since a deviation from the neutral position is very small, a beam spot on the surface of a disk has an allowable roundness and, therefore, a read/write enable state is established immediately after the end of the seek at the time t2.

Figure 9:
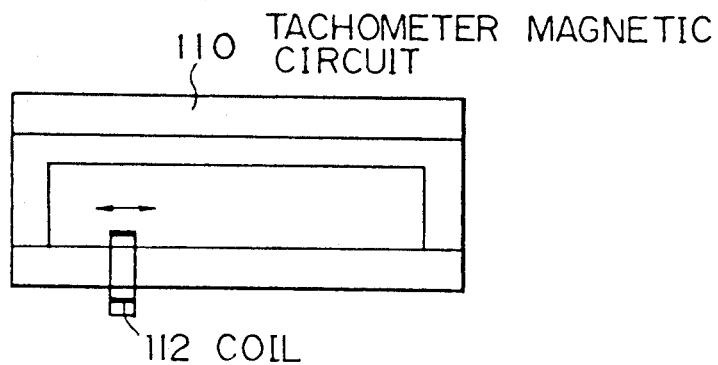
FIG. 9 is a schematic diagram showing the construction of a tachometer applied to the first embodiment of the present invention.

The velocity detector 26 is, for example, a voice coil tachometer as shown in FIG. 9. In FIG. 9, the voice coil tachometer includes a tachometer magnetic circuit 110 fixed in a diametral direction of the disk. A coil 112 mounted on the head is movable with respect to the tachometer magnetic circuit 110 in the diametral direction, so that an electromotive force corresponding to the head moving velocity is induced in the coil 112.

Again referring to FIG. 7, the control switch circuit 40 is controlled by the MPU 24. The switch SW1 is always put in an ON state to effect the servo control of the VCM positioner 16 by the positioner servo circuit 20 for both the fine control and lens seek control.

The switch SW2 is turned on for the fine control and off for the lens seek control, so that the track servo circuit 18 is effective only for the fine control in which the two-dimensional actuator is driven by the power amplifier 44 and the VCM positioner 16 is controlled so as to let a light beam keep following a track.

Namely, in the fine control, both the track servo circuit 18 and the positioner servo circuit 20 are simultaneously effective to achieve the double servo.

The switch SW3 is turned off for the fine control, and on for the lens seek control for a seek operation.

The switch SW4 is turned off during positioner seek for very long stroke accessing, i.e.. during a coarse control, and on for other cases, i.e., during a lens seek control and during a fine control.

Figure 10:
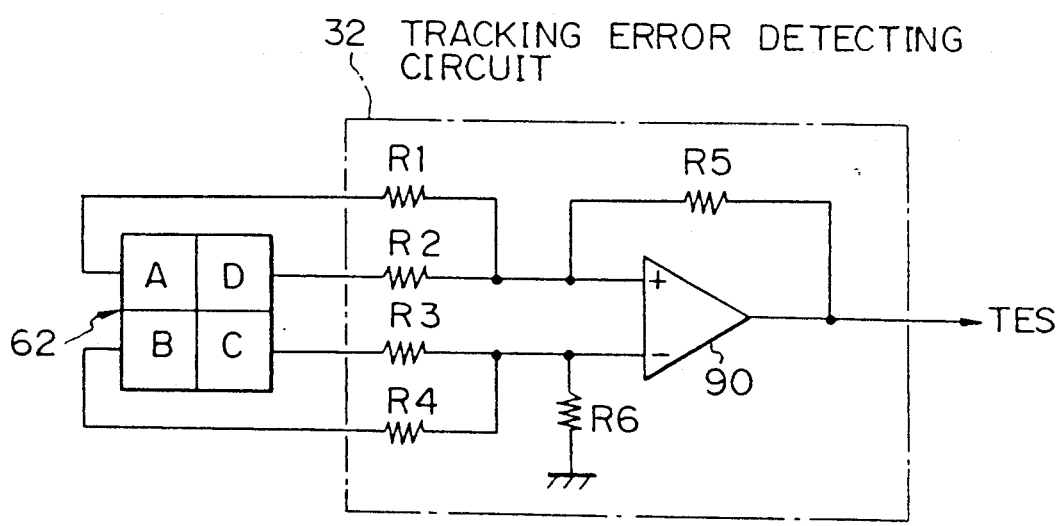
FIG. 10 is a circuit diagram showing the construction of a tracking error detecting circuit applied to the embodiments of the present invention.

FIG. 10 is a circuit diagram of a tracking error detecting circuit shown in FIG. 7.

In FIG. 10, numeral 62 denotes a quartered photosensor for receiving reflected light from the disk medium 10. This photosensor has four photosensing portions A, B, C, and D. To detect a tracking error, the photosensing portions are grouped into two, i.e., a combination of photosensing portions A and D, and a combination of photosensing portions B and C. When the beam is focused on the track, the photosensing portions A and D receive an equal amount of light as that received by the photosensing portions B and C. When a light beam deviates from the center of a track, the amount of light on one combination of the photosensing portions increases, while the amount of light on the other combination decreases.

The outputs of the photosensing portions A and D are added to each other through resistors R1 and R2, and connected to a non-inverted input terminal of a differential amplifier 90. Outputs of the photosensing portions B and C are added to each other through resistors R3 and R4, and connected to an inverted input terminal of the differential amplifier 90. The inverted input terminal of the differential amplifier 90 is connected to an input resister R6, and an output of the differential amplifier 90 is connected to its non-inverted input termlnal through a feedback resister R5. The input resister R6 and feedback resister R5 determine gain. The differential amplifier 90 subtracts a synthesized signal of the photosensing portions B and C from a synthesized signal of the photosensing portions A and D to provide a differential signal as the tracking error signal TES.

Figure 11A:
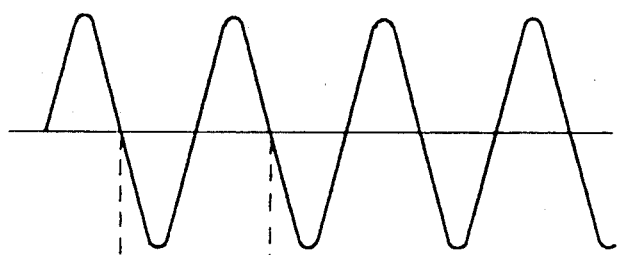
FIGS. 11A and 11B are waveform diagrams for explaining the velocity detection based on the tracking error signal, applied to the embodiments of the present invention.
Figure 11B:
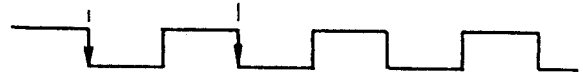

FIG. 11A shows the tracking error signal TES obtainable when a light beam successively crosses tracks during a seek operation under the lens seek control. FIG. 11B shows an output of a zero-crossing comparator that receives the tracking error signal TES. The output signal from the zero-crossing comparator is used to detect a beam velocity.

Figure 12:
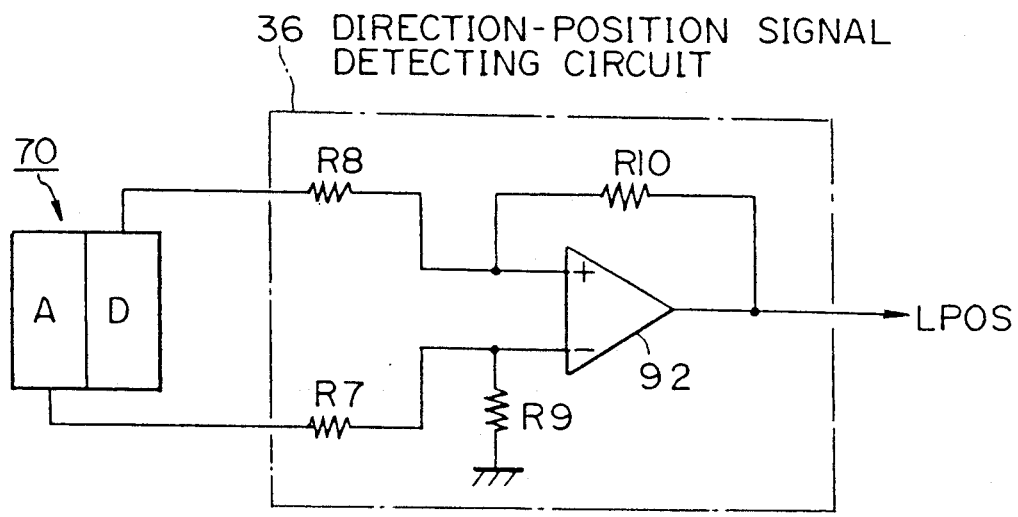
FIG. 12 is a circuit diagram showing the construction of a direction-position signal detection circuit applied to the embodiments of the present invention.

FIG. 12 is a schematic view showing an embodiment of the direction-position signal detecting circuit 36 shown in FIG. 2. In FIG. 12, numeral 70 denotes the position sensor shown in FIG. 4 having two photosensing portions A and D. When the actuator is at the neutral position, the photosensing portions A and D receive equal amounts of light. When the rotary arm 80 of the actuator 64 (see FIG. 2) turns, one of the photosensing portions receives more light, while the other photosensing portion receives less light. Outputs of the photosensing portions A and D are provided to a differential amplifier 92 through resistors R7 and R8. An inverted input terminal of the differential amplifier 92 is connected to an input resister R9, and the output thereof is connected to a non-inverted input terminal thereof through a feedback resister R10. The differential amplifier 92 detects the difference of received signals of the photosensing portions A and D, and provides the direction-position signal LPOS.

Figure 13:
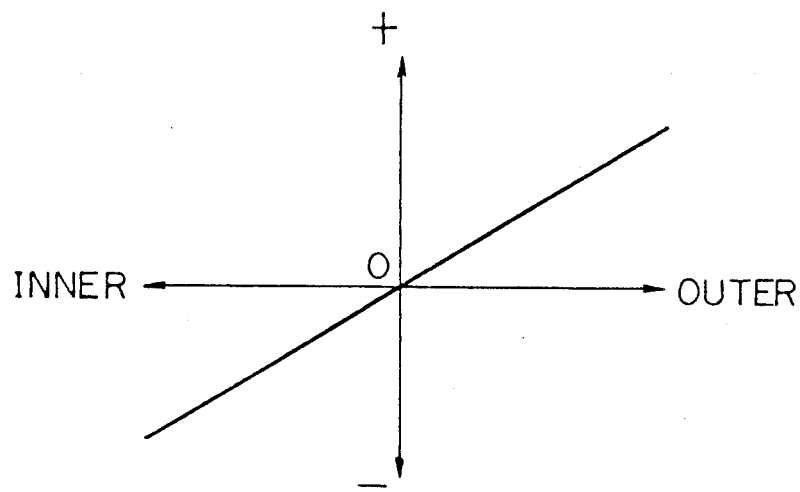
FIG. 13 is a characteristic diagram of the direction-position signal detecting circuit.

FIG. 13 is a characteristic diagram of the direction-position signal detecting circuit. For example, when the rotary arm of the actuator is turned to the outer side, a positive voltage linearly increasing in response to he amount of turn is generated. When the rotary arm of the actuator is turned to the inner side, a negative voltage linearly increasing in response to the amount of turn is generated. At the neutral position of the rotary arm of the actuator, the voltage is zero.

Figure 14:
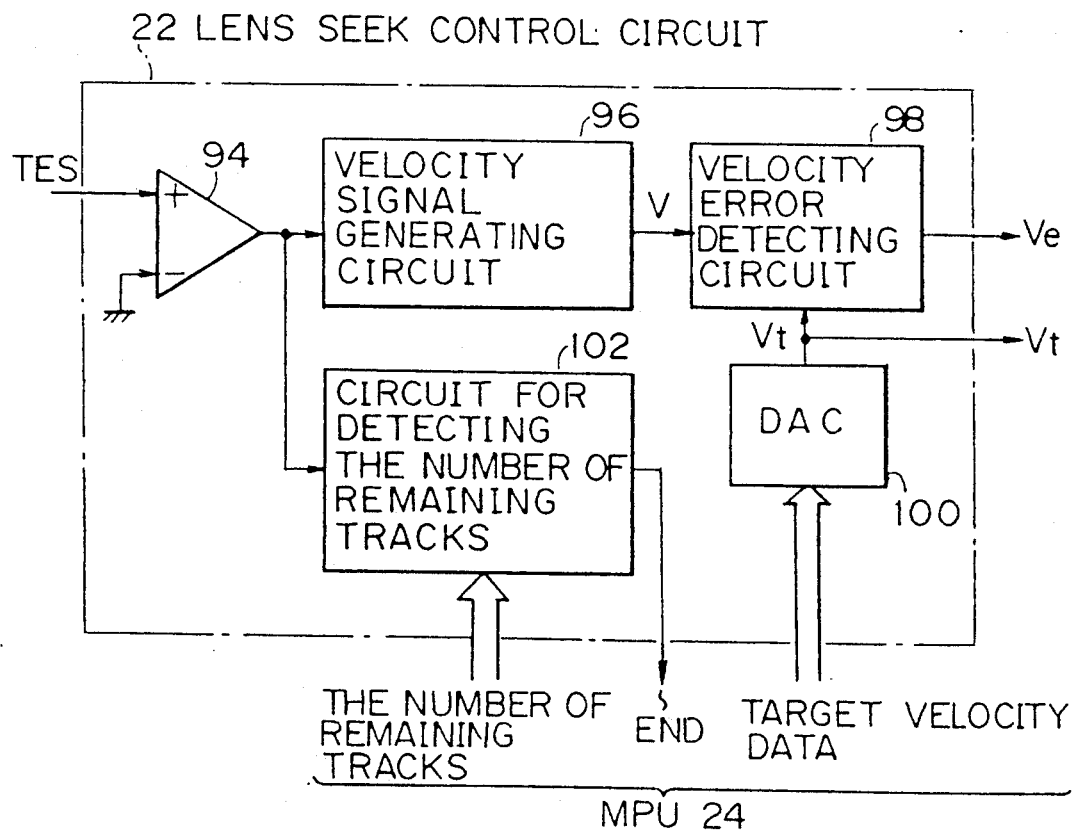
FIG. 14 is a block diagram showing a lens seek control circuit applied to the embodiments of the present invention.

FIG. 14 is a schematic view showing an embodiment of the lens seek control circuit 22 shown in FIG. 7. In FIG. 11, numeral 94 denotes a zero-crossing comparator that receives the tracking error signal TES from the tracking error detecting circuit 32 and provides a comparison output shown in FIG. 11B. The output of the zero-crossing comparator 94 is input to a velocity signal generating circuit 96. The velocity signal generating circuit 96 detects a period T of the comparator output shown in FIG. 11B by detecting fall timings of the comparator output. The period T is a time period during which a light beam passes one track pitch p=1.6 micrometers and based on which a beam moving velocity V is calculated as V=p/T. The velocity signal V formed by the velocity signal generating circuit 96 is input to a velocity error detecting circuit 98. Meanwhile, the MPU 24 provides target velocity data to a DA converter (DAC) 100 that converts the data into an analog signal voltage and provides a target velocity signal Vt to the velocity error detecting circuit 98. The circuit 98 subtracts the actual velocity V from the target velocity signal Vt to output a velocity error signal Ve.

The target velocity signal Vt output from the DA converter 100 or the beam moving velocity V is given to the velocity control circuit 26 shown in FIG. 7 and used for compensating a tracking delay of the VCM positioner 16.

The lens seek control circuit 22 further includes a circuit 102 for detecting the number of remaining tracks. At the time of starting a seek operation, the MPU 24 sets the number of remaining tracks counted from a current track to a target track into the circuit 102 for detecting the number of remaining tracks. The set number of remaining tracks up to the target track is reduced by one at, for example, each fall of a comparison output of the zero-crossing comparator 94 shown in FIG. 11B. When the light beam reaches the target track, the number of remaining tracks in the circuit 102 for detecting the number of remaining tracks wi be zero, and the circuit 102 informs the MPU 24 of the end of the seek operation.

Next, an operation of the first embodiment of the present invention will be explained with reference to an operation flowchart of FIG. 15 and FIG. 7.

First, a higher device requires a read access or write access from the MPU 24. In step S1, the MPU 24 turns off the switch SW2 of the control switch circuit 40 to turn off the track servo of the two-dimensional actuator 64. In step S2, the MPU 24 turns on the switch SW3 to start a seek operation. Namely, a fine control which has been carried out up to that time is turned off in step S1 and switched to a lens seek control in Step S2. When the lens seek is started in Step S2, the MPU 24 sets target velocity data and the number of remaining tracks up to a target track into the lens seek control circuit 22. At this time, the switch SW1 is in an ON state, so that the positioner servo circuit 20 continues the positioning servo of the VCM positioner 16.

As shown in FIG. 14, the lens seek control circuit 22 outputs a velocity error signal Ve to the power amplifier 44 (see FIG. 7), which drives the tracking coil, thereby controlling the velocity of the rotary arm 80 (see FIG. 3) of the two-dimensional actuator 64 (see FIG. 2) to move a light beam to the target track. When this velocity control is started, the lens seek control circuit 22 provides a target velocity signal Vt or a beam moving velocity signal V to the velocity control circuit 28. Since a positioner moving velocity signal Vp output from the velocity detector 26 is zero at first, an acceleration voltage based on the target velocity signal Vt or the beam moving velocity signal V is provided to the VCM positioner 16 through the adder 25 and the power amplifier 46. As a result, the VCM positioner 16 accelerates the optical head block 12 to attain the target velocity. By the velocity control, the velocity Vp detected by the velocity detector 26 coincides with the target velocity Vt when the acceleration is completed. In this way, the rotary arm of the two-dimensional actuator 64 mounted on the optical head block 12 is substantially kept at its neutral position during the seek operation.

When the number of remaining tracks becomes zero in the lens seek control circuit 22, the end of the lens seek is judged in step S3 to open the switch SW3. Thereafter, in step S4, the switch SW2 is closed to start the track servo. Immediately after the seek operation is completed, a read/write enable state is established without waiting for a particular settling time.

Figure 16:
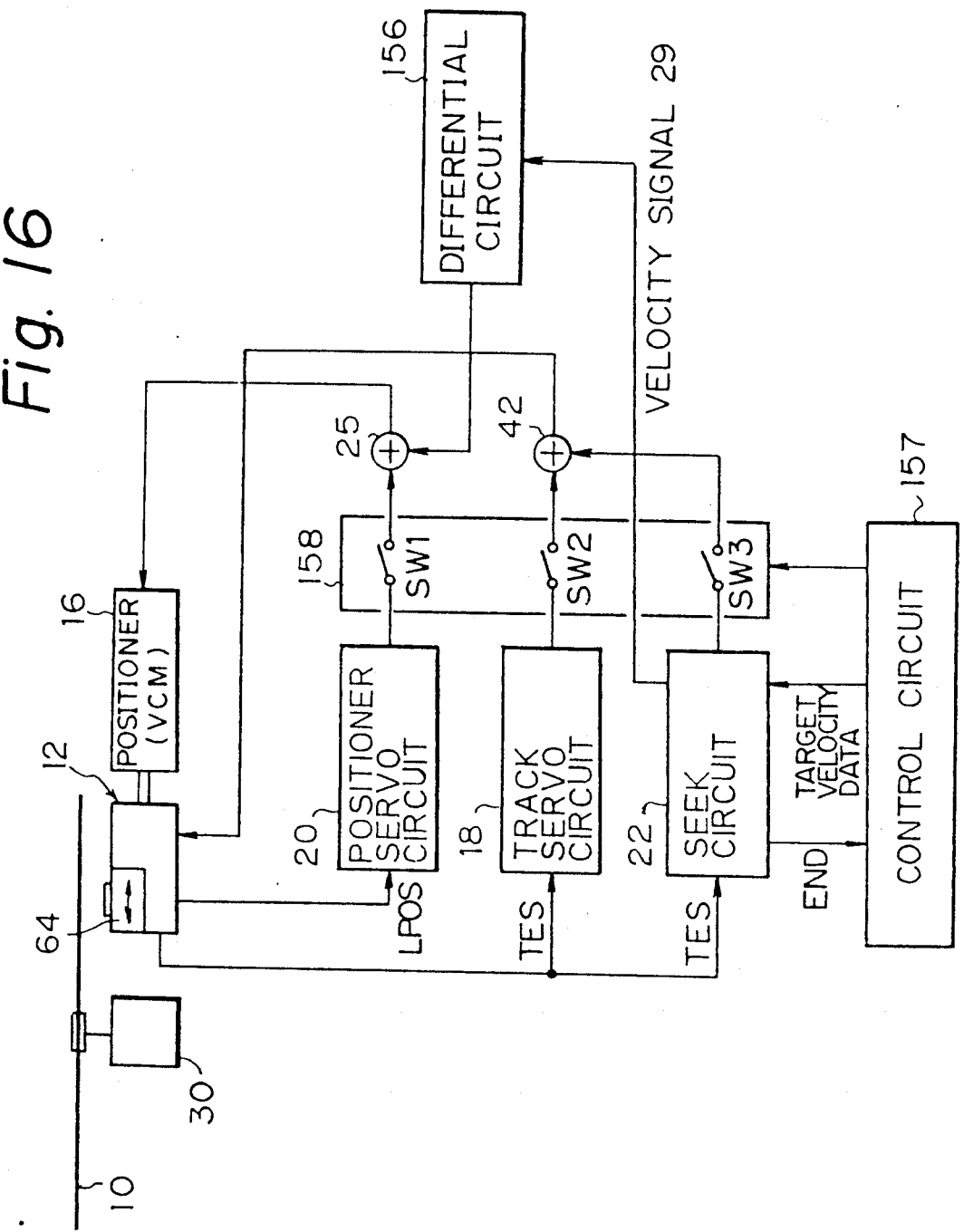
FIG. 16 is a block diagram for explaining the principle of the second embodiment of the present invention.

FIG. 16 is an explanatory view of the principle of the second embodiment of the present invention.

The difference between the circuit shown in FIG. 6 and FIG. 16 is that, in place of the velocity control circuit 28 in FIG. 6, a differential circuit 156 is connected between the seek circuit 22 and the adder 25. As a result of removing the velocity control circuit 28 shown in FIG. 6, the line connections between the velocity detector 26 and the velocity control circuit 28, between the seek circuit 22 and the velocity control circuit 28, and between the velocity control circuit 28 and the adder 25 are removed in FIG. 16, and, instead, line connections between the seek circuit 22 and the differential circuit 156 and between the differential circuit 156 and the adder 25 are provided in FIG. 16. Also, in FIG. 16, a switch control circuit 158 includes the three switches SW1, SW2, and SW3, but does not include the switch SW4 shown in FIG. 6. Further, a control circuit 157 does not provide the target velocity signal shown in FIG. 6. The seek circuit 22 provides a velocity signal 29 which is applied to the differential circuit 156. The other portions are the same in FIGS. 6 and 16, and therefore, the detailed description of the constitution of the circuit shown in FIG. 16 is omitted here.

During a seek operation, the control circuit 157 controls the switch control circuit 158 to put the track servo circuit 18 in an inoperable state (servo OFF) and to operate (servo ON) the seek circuit 22. With co-operation of the rotary arm of the actuator 64 and the VCM positioner 16, the light beam of the optical head block 12 is moved to the target track position. When the light beam reaches the target track position, the control circuit 157 controls the switch control circuit 158 to put the seek circuit 22 in an inoperable state, and to operate the track servo circuit 18, thereby letting the light beam keep following the target track by the double servo.

In the above mentioned disk unit of the second embodiment of the present invention, to prevent a tracking delay from occurring during seek by the positioner servo circuit 20 operated at a low servo frequency band, a differential circuit 156 is provided for differentiating a velocity signal output from the seek circuit 22, and the adding circuit 25 is used for adding an output of the differential circuit 156 to a signal from the positioner servo circuit 20, i.e., the signal obtained by applying a phase compensation on the direction-position signal LPOS.

The velocity signal to be differentiated by the differential circuit 156 may be a beam moving velocity signal or a target velocity signal from the seek circuit 22.

According to the above arrangement of the second embodiment of the present invention, a signal obtainable by differentiating the target velocity signal or the actual velocity signal generated for velocity control during a seek operation is generated at every fall and rise of the target velocity signal and added to the signal obtained by phase compensation of the direction-position signal LPOS which is provided by a position sensor in the actuator, thereby accelerating or decelerating the VCM positioner. Even if the VCM positioner has a very low servo frequency band, the VCM positioner can be accelerated by the differentiated signals added externally to the signal passing through the loop including the optical head block 12, the positioner circuit 20, and the VCM positioner 16. Accordingly, the VCM positioner 16 can speedily move and stop following the movement of the track actuator. Accordingly, a settling time from the completion of seek to the establishment of a read/write enable state can greatly be reduced, thereby realizing high-velocity accessing. To add the differential component of a velocity signal to the current supplied to the VCM positioner 16 is identical to the addition of an acceleration to the acceleration of the VCM positioner, since the VCM driving current is proportional to its acceleration. Accordingly, it is understood that the second embodiment of the present invention can ensure the tracking performance of the positioner.

Figure 17:
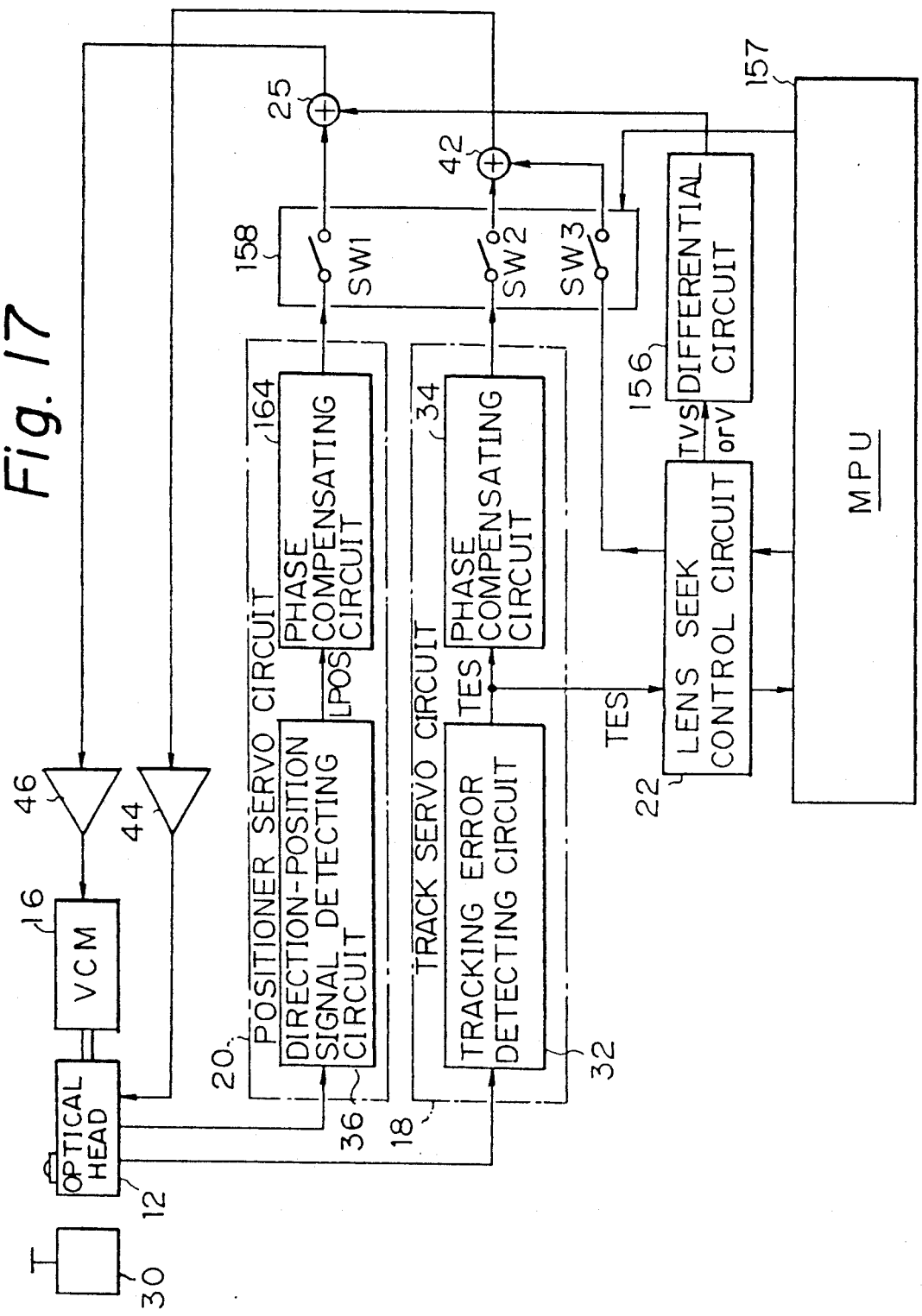
FIG. 17 is a block diagram showing the second embodiment of the present invention.

FIG. 17 is a schematic view showing the second embodiment of the present invention in detail.

In FIG. 17, the constitutions of the positioner servo circuit 20 and the track servo circuit 18 are shown in detail. Namely, the positioner servo circuit 20 includes a tracking error detecting circuit 32, and a phase compensating circuit 34. The tracking error detecting circuit 32 detects a tracking error signal TES from an output of the quartered photosensor arranged in the optical head block 12. The phase compensating circuit 34 compensates a phase advance of the tracking error signal TES according to high-frequency-band components of a servo frequency band, and provides the signal to a switch SW2 in the control switch circuit 158, which provides the signal to the power amplifier 44 through an adder 42. An output of the power amplifier 44 drives a tracking coil of the two-dimensional actuator incorporated in the optical head block 12.

The positioner servo circuit 20 includes a direction-position signal detecting circuit 36, and a phase compensating circuit 164. The direction-position signal detecting circuit 36 receives an output of, for example, a halved photosensor that detects a deviation of the two-dimensional oscillating track actuator disposed in the optical head block 12 from the neutral position, and the circuit 36 generates a direction-position signal LPOS. The phase compensating circuit 164 compensates a phase advance of high-frequency-band components of a servo frequency band of the signal LPOS. The function of the phase compensating circuit 164 is the same as the filter circuit 38 shown in FIG. 7. The output of the phase compensating circuit 164 is then supplied to a power amplifier 46 through a switch SW1 in the control switch circuit 158 and the adder 25. The power amplifier 46 drives the VCM positioner 16.

The track servo circuit 18 has a higher servo frequency band of 2 to 5 KHz, while the positioner servo circuit 20 has a very lower servo frequency band of around 30 Hz due to the mechanical play of a shaft of the two-dimensional actuator disposed in the optical head block 12.

Numeral 157 denotes a microprocessing unit MPU acting as a control means. The MPU 157 carries out a seek operation by the lens seek control based on an access demand from a higher device, and switches to fine control after the completion of the seek operation.

Numeral 22 denotes the lens seek control circuit. Similar to the first embodiment, the seek control circuit 22 carries out a seek operation to move a light beam to a target track by controlling the velocity of the rotary arm of the two dimensional actuator incorporated in the optical head block 12. The MPU 157 provides target velocity data Vt to the lens seek control circuit 22. On the other hand, a beam moving velocity V is detected from the tracking error signal TES provided by the tracking error detecting circuit 32. When receiving a seek operation instruction from the MPU 157, the lens seek control circuit 22 subtracts the actual velocity V from the target velocity Vt to find a velocity error Ve, which drives the tracking coil of the rotary arm in the two-dimensional actuator disposed in the optical head block 12 through a switch SW3 in the control switch circuit 158, the adder 42, and the power amplifier 44.

Further, according to the second embodiment of the present invention, a tracking delay of the VCM positioner 16 driven by the positioner servo circuit 20 during a seek operation is prevented by the differential circuit 156 and the adder 25. Namely, the lens seek control circuit 22 provides a target velocity signal TVS or an actual velocity signal V to the differential circuit 156, which provides a differentiated output at every rise and fall of the velocity signal. The adder 25 adds the differentiated output to the direction-position signal LPOS from the positioner servo circuit 20, and supplies the result of the addition to the power amplifier 46. Accordingly, the VCM positioner 16 is accelerated by a differentiated signal generated at each rise, and decelerated by a differentiated signal generated at each fall, thereby realizing the same tracking characteristics as those of the rotary arm in the track actuator 64 even when the VCM positioner is driven by a low servo frequency band.

The control switch circuit 158 is controlled by the MPU 157. The switch SW1 is always put in an ON state to effect the servo control of the VCM positioner by the positioner servo circuit 20 for both the fine control and the lens seek control.

The switch SW2 is turned on for the fine control and off for the lens seek control, so that the track servo circuit 18 is effective only for the fine control which lets a light beam keep following a track. When the first track servo circuit 18 is effective, the second track servo circuit 20 is simultaneously effective to achieve the double servo action by both the circuits 18 and 20.

The switch SW3 is turned off for the fine control, and on for the lens seek control for the seek operation.

Figure 15:
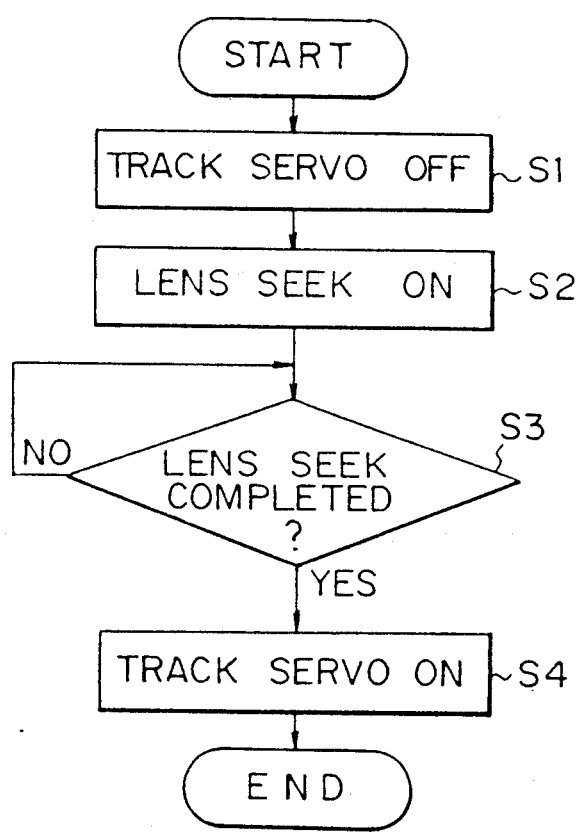
FIG. 15 is a flowchart for explaining the operation of the circuit shown in FIG. 7.

Although the flowchart shown in FIG. 15 explains the operation of the first embodiment shown in FIG. 7, the same flowchart of FIG. 15 can explain the second embodiment shown in FIG. 17. The difference in operation between the first embodiment and the second embodiment resides in the step S2. Namely, in the second embodiment, when the seek control is started, a rise of the target velocity signal is differentiated by the differential circuit 156. The differentiated signal of the target velocity signal from the differential circuit 156 is added through the adder 25 to drive the VCM positioner 16, which moves and positions the optical head block 12 mounted on the positioner. As a result, the movement of the VCM positioner 16 becomes similar to that of the rotary arm of the actuator 64 in the optical head block 12.

FIGS. 18A to 18F are graphs for explaining the effect of the second embodiment of the present invention. In the figures, at time t1, the seek is started, and the seek ends at time t2. During the seek period between the times t1 and t2, the lens seek target velocity Vt is generated. A differentiated signal shown in FIG. 18E and derived by differentiating the target velocity Vt controls the VCM positioner 16, so that the velocity of the VCM positioner 16 has only a slight rise delay and a fall delay with respect to the lens seek target velocity Vt, as shown in FIG. 18F. Therefore, lens position sensor signal with respect to the positioner shown in FIG. 18C, i.e., the direction-position signal LPOS is generated only just slightly after the start of the seek and just after the end of the seek. Accordingly, at the time of switching control just after the time t2, the rotary arm of the two-dimensional actuator, i.e., the object lens, is positioned substantially at the neutral position. Since a deviation from the neutral position is very small, a beam spot on the surface of a disk has an allowable roundness and, therefore, a read/write enable state is established just after the end of the seek at the time t2.

Although the target velocity signal is differentiated and added in the second embodiment, it is possible to differentiate and add a beam moving velocity signal.

Although both of the above embodiments employ the two dimensional actuator, the present invention is not limited to this. The present invention is applicable, as long as the double servo is achieved with a VCM positioner operated at a servo frequency band which is very low compared to that of tracking control by a moving part in an actuator, for actuators having other structures such as a galvano-mirror actuator and a relay lens actuator.

As explained above, the present invention can remarkably reduce a setting time after the end of a lens seek operation until the establishment of a read/write enable state, thereby realizing high-speed accessing of an optical disk unit.

What is claimed is:

1. A track access control circuit of an optical disk unit, comprising:
    a track actuator having a base and a movable part associated with said base with a mechanical play therebetween, said movable part moving a light beam on a rotary medium;
    a positioner, fixed to said base of said track actuator, for moving said track actuator in a diametral direction of said rotary medium;
    track actuator servo means, operatively connected to said rotary arm of said track actuator, for controlling said rotary arm at a relatively high frequency;
    positioner servo means, operatively connected to said positioner, for controlling said positioner in such a way that the movable part of said track actuator is kept to be positioned at a neutral position with respect to said positioner, the frequency of the control of said positioner being limited to a relatively low value due to said mechanical play between said movable part and said base;

seek means, operatively connected to said movable part of said track actuator, for controlling the velocity of said movable part in accordance with an error of the velocity of the moving light beam with respect to a target velocity, and moving the light beam to a target track position;

control means, operatively connected to said track servo means, to said positioner servo means, and to said seek means, for putting said track servo means into an inoperable state and for putting said positioner servo means and said seek means into operating states during a seek operation, so as to move the light beam to the target track position with cooperation of said movable part of said track actuator and said positioner, while, upon the light beam reaching the target track position, for putting said seek means in an inoperative state and for putting said track servo means and said positioner servo means to let the light beam follow the target track by a double servo action of said movable part of said track actuator and said positioner;

velocity signal generating means for generating a velocity signal having a predetermined relationship with the target velocity of said positioner during the seek operation; and positioner velocity modification means for modifying an output of said positioner servo means based on said velocity signal output from said velocity signal generating means.

2. A track access control circuit of an optical disk unit as set forth in claim 1, wherein said velocity signal output from said velocity signal generating means is a target velocity of said positioner set by said control means.

3. A track access control circuit of an optical disk unit as set forth in claim 1, wherein said velocity signal output from said velocity signal generating means is a moving velocity of the light beam detected by said seek means based on a tracking error signal.

4. A track access control circuit of an optical disk unit as set forth in claim 1, wherein said seek means comprises:

velocity signal generating means for setting a beam moving velocity based on the tracking error signal;

velocity error detecting means for detecting a velocity error of the velocity signal provided by the velocity signal generating means with respect to a target velocity signal set by said control means; and remaining track number detection means for detecting the number of remaining tracks to a target track for informing the control means of the completion of seek when the number of remaining tracks becomes zero.

5. A track access control circuit of an optical disk unit as set forth in claim 1, wherein said velocity signal generating means comprises:

positioner moving velocity detecting means for detecting the moving velocity of said positioner;

target velocity signal generating means for setting a target velocity of said positioner during said seek operation; and;

subtracting means for subtracting the moving velocity of said positioner from said target velocity to provide said velocity signal; and said positioner-velocity modification means comprises adding means for adding the output of said positioner servo means and said velocity signal, the added signal being supplied to said positioner during said seek operation.

6. A track access control circuit of an optical disk unit as set forth in claim 1, wherein said velocity signal generating means comprises:

positioner moving velocity detecting means for detecting the moving velocity of said positioner;

beam-moving velocity detecting means for detecting a moving velocity of the light beam based on said tracking error signal; and subtracting means for subtracting moving velocity of said positioner from said moving velocity of the light beam to provide said velocity signal; and said positioner-velocity modification means comprises adding means for adding the output of said positioner servo means and said velocity signal, the added signal being supplied to sad positioner during said seek operation.

7. A track access control circuit of an optical disk unit as set forth in claim 1 wherein said velocity signal generating means comprises:

beam-moving velocity detecting means for detecting a moving velocity of the light beam based on said tracking error signal; and differential means for differentiating said moving velocity of the light beam; and said positioner-velocity modification means comprises adding means for adding the output of said positioner servo means and the output of said differential means, the added signal being supplied to said positioner during said seek operation.

8. A track access control circuit of an optical disk unit as set forth in claim 1, wherein said velocity signal generating means comprises:

target velocity forming means for forming a target velocity of said positioner during said seek operation; and differential means for differentiating said target velocity of said positioner; and said positioner-velocity modification means comprises adding means for adding the output of said positioner servo means and the output of said differential means, the added signal being supplied to said positioner during said seek operation.

9. A track access control circuit of an optical disk unit as set forth in claim 1, wherein said track actuator is a two-dimensional actuator having said base and a rotary arm as said movable part, said rotary arm being provided with an object lens for focusing a light to move the light beam across tracks of a rotary medium, said rotary are being movable through a shaft associated with said base by said mechanical play.

10. A track access control circuit of an optical disk unit as set forth in claim 1, wherein said positioner servo means comprises means for controlling said positioner in such a way as to minimize a direction-position signal that indicates a deviation and direction of said movable part from a neutral position with respect to said base.

11. A track access control circuit of an optical disk unit as set forth in claim 1, wherein said positioner servo means comprises means for controlling said positioner in such a way as to minimize said tracking error signal.

* * * * *